United States Patent
Akaki

(10) Patent No.: US 12,534,557 B2
(45) Date of Patent: Jan. 27, 2026

(54) GRAFT COPOLYMER RESIN

(71) Applicant: NIPPON A&L INC., Osaka (JP)

(72) Inventor: Kazuto Akaki, Niihama (JP)

(73) Assignee: NIPPON A&L INC., Osaka (JP)

( * ) Notice: Subject to any disclaimer, the term of this patent is extended or adjusted under 35 U.S.C. 154(b) by 598 days.

(21) Appl. No.: 17/778,551

(22) PCT Filed: Dec. 16, 2020

(86) PCT No.: PCT/JP2020/047028
§ 371 (c)(1),
(2) Date: May 20, 2022

(87) PCT Pub. No.: WO2021/131984
PCT Pub. Date: Jul. 1, 2021

(65) Prior Publication Data
US 2023/0013191 A1 Jan. 19, 2023

(30) Foreign Application Priority Data
Dec. 27, 2019 (JP) ................................ 2019-239004

(51) Int. Cl.
| C08F 265/06 | (2006.01) |
| C08F 212/08 | (2006.01) |
| C08F 220/18 | (2006.01) |
| C08F 220/44 | (2006.01) |

(52) U.S. Cl.
CPC .......... *C08F 265/06* (2013.01); *C08F 212/08* (2013.01); *C08F 220/1804* (2020.02); *C08F 220/44* (2013.01)

(58) Field of Classification Search
CPC .... C08F 265/04; C08F 265/06; C08F 220/42; C08F 220/44; C08F 220/18; C08F 220/1804; C08F 220/1805; C08F 220/1806; C08F 220/1807; C08F 220/1808; C08F 220/1809; C08F 220/1811; C08F 220/1812; C08F 220/1818; C08F 212/08; C08F 212/10
See application file for complete search history.

(56) References Cited

U.S. PATENT DOCUMENTS

| 3,898,301 A | 8/1975 | Konishi et al. |
| 2016/0333178 A1* | 11/2016 | Shimozawa ............... C08J 5/00 |
| 2020/0165370 A1 | 5/2020 | Iwanaga et al. |

FOREIGN PATENT DOCUMENTS

| CN | 102149772 A | 8/2011 |
| CN | 102782039 A | 11/2012 |
| CN | 103649141 A | 3/2014 |
| CN | 105940051 A | 9/2016 |
| CN | 106795355 A | 5/2017 |
| JP | S48-102851 A | 12/1973 |
| JP | S56-57813 A | 5/1981 |
| JP | H3-050212 A | 3/1991 |
| JP | H4-185663 A | 7/1992 |
| JP | H7-173361 A | 7/1995 |
| JP | H8-113689 A | 5/1996 |
| JP | H9-316291 A | 12/1997 |
| JP | 2002-194034 A | 7/2002 |
| JP | 2003-026742 A | 1/2003 |
| JP | 2009-091540 A | 4/2009 |
| JP | 2009-540045 A | 11/2009 |
| JP | 2017-052920 A | 3/2017 |
| KR | 20070117315 | 12/2007 |
| WO | WO 2007/142473 A1 | 12/2007 |
| WO | WO 2011/108486 A1 | 9/2011 |
| WO | WO 2013/080563 A1 | 6/2013 |
| WO | WO 2015/119040 A1 | 8/2015 |

OTHER PUBLICATIONS

International Search Report mailed Feb. 16, 2021 for International Application No. PCT/JP2020/047028, 3 pages.
International Preliminary Report on Patentability mailed Jul. 7, 2022 for International Application No. PCT/JP2020/047028, with English translation, 5 pages.
Non-Final Office Action in U.S. Appl. No. 15/108,700 dated Jan. 29, 2018.
Response to Non-Final Office dated Jan. 29, 2018 in U.S. Appl. No. 15/108,700, filed Apr. 18, 2018.

* cited by examiner

*Primary Examiner* — Jeffrey S Lenihan
(74) *Attorney, Agent, or Firm* — Squire Patton Boggs (US) LLP

(57) ABSTRACT

A graft copolymer resin obtainable by graft-polymerizing a vinyl monomer comprising a vinyl cyanide monomer and an aromatic vinyl monomer to a rubbery polymer, in which a free resin contained in the graft copolymer resin comprises 10 to 35% by mass of a constituent unit derived from a (meth)acrylic acid alkyl ester having an alkyl group containing 4 or more carbon atoms, based on the total amount of the free resins, and the graft copolymer resin satisfies at least one of the following requirements (1) and (2):

(1) the rubbery polymer comprises a constituent unit derived from a (meth)acrylic acid alkyl ester having an alkyl group containing 4 or more carbon atoms; and
(2) the vinyl monomer further comprises a (meth)acrylic acid alkyl ester having an alkyl group containing 4 or more carbon atoms.

9 Claims, No Drawings

GRAFT COPOLYMER RESIN

CROSS-REFERENCE

This application is a National Stage filing under 35 U.S.C. § 371 of International Patent Application No. PCT/JP2020/047028, filed Dec. 16, 2020, which claims the benefit of and priority to Japanese Patent Application No. 2019-239004, filed Dec. 27, 2019, the contents of all of which are hereby incorporated by reference in their entireties for all purposes.

TECHNICAL FIELD

The present invention relates to a graft copolymer resin.

BACKGROUND ART

Rubber-reinforced thermoplastic resins are excellent in molding processability, impact resistance, mechanical strength, and the like, and are often used in industrial parts and household electrical appliances. In these applications, there are many opportunities for contact with various chemicals, detergents, and the like, and it is required to impart chemical resistance to the rubber-reinforced thermoplastic resin.

For example, Patent Literatures 1 to 3 disclose that a rubber-reinforced thermoplastic resin obtained by graft polymerization of a predetermined monomer to an acrylic rubbery polymer is excellent in chemical resistance.

CITATION LIST

Patent Literature

Patent Literature 1: Japanese Unexamined Patent Publication No. H7-173361
Patent Literature 2: Japanese Unexamined Patent Publication No. H8-113689
Patent Literature 3: Japanese Unexamined Patent Publication No. H9-316291

SUMMARY OF INVENTION

Technical Problem

In recent years, there has been a demand for a rubber-reinforced thermoplastic resin with further improved chemical resistance for the purpose of improving product quality, and the like. Therefore, an object of the present invention is to provide a rubber-reinforced thermoplastic resin with improved chemical resistance, particularly solvent resistance.

Solution to Problem

As a result of intensive studies to solve the above problems, the present inventors have found that the above problems can be solved by the inventions described in the following [1] to [4].

[1] A graft copolymer resin obtainable by graft-polymerizing a vinyl monomer comprising a vinyl cyanide monomer and an aromatic vinyl monomer to a rubbery polymer, in which a free resin contained in the graft copolymer resin contains 10 to 35% by mass of a constituent unit derived from a (meth)acrylic acid alkyl ester having an alkyl group containing 4 or more carbon atoms, based on the total amount of the free resins, and the graft copolymer resin satisfies at least one of the following requirements (1) and (2):

(1) the rubbery polymer comprises a constituent unit derived from a (meth)acrylic acid alkyl ester having an alkyl group containing 4 or more carbon atoms; and (2) the vinyl monomer further comprises a (meth)acrylic acid alkyl ester having an alkyl group containing 4 or more carbon atoms.

[2] The graft copolymer resin according to [1], in which the vinyl monomer comprises 10 to 30% by mass of a (meth)acrylic acid alkyl ester having an alkyl group containing 4 or more carbon atoms, based on the total amount of the vinyl monomers.

[3] The graft copolymer resin according to [1] or [2], in which the rubbery polymer comprises 50% by mass or more of a constituent unit derived from a (meth)acrylic acid alkyl ester having an alkyl group containing 4 or more carbon atoms, based on the total amount of the rubbery polymers.

[4] The graft copolymer resin according to any of [1] to [3], in which the rubbery polymer has a gel content of 75 to 90%.

Advantageous Effects of Invention

According to the present invention, it is possible to provide a rubber-reinforced thermoplastic resin with improved solvent resistance. Furthermore, the rubber-reinforced thermoplastic resin of the present invention has sufficient weather resistance, impact resistance, and fluidity.

DESCRIPTION OF EMBODIMENTS

Hereinafter, preferred embodiments of the present invention will be described. In the present specification, "(meth)acrylic acid ester" refers to an acrylic acid ester or a methacrylic acid ester, and the same applies to similar expressions such as "(meth)acrylate".

The graft copolymer resin of the present embodiment is formed by graft polymerization of a vinyl monomer to a rubbery polymer. The graft copolymer resin may contain, in addition to a graft copolymer obtainable by graft-polymerizing a vinyl monomer to a rubbery polymer, a free resin obtained by polymerizing vinyl monomers with each other, an unreacted vinyl monomer, and the like. The free resin contained in the graft copolymer resin may be a free resin generated at the time of producing the rubbery polymer, or may be a free resin generated by reacting a monomer that is unreacted at the time of producing the rubbery polymer in the graft polymerization.

Examples of the rubbery polymer include butadiene rubbery polymers such as polybutadiene, a styrene-butadiene copolymer, and an acrylonitrile-butadiene copolymer; ethylene-propylene rubbery polymers such as an ethylene-propylene copolymer and an ethylene-propylene-diene copolymer; (meth)acrylic rubbery polymers mainly composed of (meth)acrylic acid ester monomer such as methyl (meth)acrylate, ethyl (meth)acrylate, butyl (meth)acrylate, and 2-ethylhexyl (meth)acrylate; silicone rubbery polymers; composite rubbery polymers of butadiene rubbery polymer/(meth)acrylic rubbery polymer; composite rubbery polymers of silicone rubbery polymer/(meth)acrylic rubbery polymer, chlorinated polyethylene rubbers, and the like. These can be used singly or in combination of two or more kinds thereof.

Among these rubbery polymers, a (meth)acrylic rubbery polymer is preferable from the viewpoint of further improving solvent resistance, and a (meth)acrylic rubbery polymer containing a constituent unit derived from a (meth)acrylic acid alkyl ester having an alkyl group containing 4 or more carbon atoms is preferable. From the viewpoint of further improving solvent resistance, the content of the constituent unit derived from a (meth)acrylic acid alkyl ester having an alkyl group containing 4 or more carbon atoms in the (meth)acrylic rubbery polymer is preferably 50% by mass or more, more preferably 60% by mass or more, and further preferably 70% by mass or more. The upper limit of the content of the constituent unit derived from a (meth)acrylic acid alkyl ester having an alkyl group containing 4 or more carbon atoms in the (meth)acrylic rubbery polymer is not particularly limited, and can be, for example, 95% by mass or less.

Examples of the (meth)acrylic acid alkyl ester having an alkyl group containing 4 or more carbon atoms include butyl (meth)acrylate, hexyl (meth)acrylate, 2-ethylhexyl (meth)acrylate, octyl (meth)acrylate, and the like. The upper limit of the number of carbon atoms of the alkyl group in the (meth)acrylic acid alkyl ester having an alkyl group containing 4 or more carbon atoms is not particularly limited, and can be, for example, 15 or less, or 10 or less.

The acrylic rubbery polymer may be cross-linked with a crosslinking agent. Examples of the crosslinking agent include divinylbenzene, allyl (meth)acrylate, ethylene glycol di(meth)acrylate, diallyl phthalate, dicyclopentadiene di(meth)acrylate, trimethylolpropane tri(meth)acrylate, pentaerythritol hexa(meth)acrylate, 1,4-butanediol di(meth)acrylate, 1,6-hexanediol di(meth)acrylate, triallyl cyanurate, triallyl isocyanurate, and the like.

The acrylic rubbery polymer may have a constituent unit derived from a monomer other than the above-mentioned monomers, for example, a constituent unit derived from a conjugated diene monomer, an aromatic vinyl monomer, or a vinyl cyanide monomer.

Examples of the conjugated diene monomer include 1,3-butadiene, isoprene, 2-chloro-1,3-butadiene, chloroprene, 2-methyl-1,3-butadiene, 2,3-dimethyl-1,3-butadiene, and the like, and one or two or more thereof can be used.

Examples of the aromatic vinyl monomer include styrene, α-methylstyrene, para-methylstyrene, bromo styrene, and the like, and one or two or more thereof can be used.

Examples of the vinyl cyanide monomer include acrylonitrile, methacrylonitrile, ethacrylonitrile, fumaronitrile, and the like, and one or two or more thereof can be used.

The content of the constituent unit derived from the conjugated diene monomer, the aromatic vinyl monomer, or the vinyl cyanide monomer in the rubbery polymer can be each independently, for example, 30% by mass or less, more preferably 20% by mass or less, and further preferably 10% by mass or less. The lower limit of the content when the rubbery polymer contains these constituent units is not particularly limited, but can be each independently, for example, 1% by mass or more.

The rubbery polymer of the present embodiment can be produced by a conventionally known method, for example, emulsion polymerization. In the emulsion polymerization, a polymerization initiator, an emulsifier, a polymerization regulator or the like may be used.

Examples of the polymerization initiator include water-soluble polymerization initiators such as potassium persulfate, sodium persulfate, and ammonium persulfate; and oil-soluble polymerization initiators such as cumene hydroperoxide, benzoyl peroxide, t-butyl hydroperoxide, acetyl peroxide, diisopropylbenzene hydroperoxide, and 1,1,3,3-tetramethylbutyl hydroperoxide.

Examples of the emulsifier include a carboxylate, a sulfate, a sulfonate, and the like. Specific examples of the emulsifier to be preferably used include potassium oleate, dipotassium alkenyl succinate, sodium rosinate, potassium rosinate, sodium dodecylbenzene sulfonate, and the like.

Examples of the polymerization regulator include alkyl mercaptans such as n-dodecyl mercaptan and t-dodecyl mercaptan, and the like.

From the viewpoint of improving impact resistance of the graft copolymer resin, the rubbery polymer preferably has a gel content of 75 to 90%. The gel content of the rubbery polymer is measured, for example, by a method of Examples described later.

From the viewpoint of balance between impact resistance and fluidity, the graft copolymer resin of the present embodiment preferably contains 10 to 90% by mass, more preferably 30 to 80% by mass, and further preferably 40 to 70% by mass of the rubbery polymer.

The vinyl monomer used for the graft polymerization includes a vinyl cyanide monomer and an aromatic vinyl monomer. The vinyl monomer preferably further contains a (meth)acrylic acid alkyl ester having an alkyl group containing 4 or more carbon atoms. As the vinyl cyanide monomer, the aromatic vinyl monomer, and the (meth)acrylic acid alkyl ester having an alkyl group containing 4 or more carbon atoms, those similar to the above described ones can be suitably used.

The content of the vinyl cyanide monomer used for the graft polymerization can be, for example, 10 to 40% by mass, preferably 15 to 35% by mass, and more preferably 20 to 30% by mass, based on the total amount of the vinyl monomers. The content of the aromatic vinyl monomer used for the graft polymerization can be, for example, 40 to 80% by mass, preferably 45 to 75% by mass, and more preferably 50 to 70% by mass, based on the total amount of the vinyl monomers.

From the viewpoint of further improving solvent resistance, the content of the (meth)acrylic acid alkyl ester having an alkyl group containing 4 or more carbon atoms in the vinyl monomer used for the graft polymerization is preferably 10 to 30% by mass, based on the total amount of the vinyl monomers.

The free resin contained in the graft copolymer resin of the present embodiment contains 10 to 35% by mass of a constituent unit derived from a (meth)acrylic acid alkyl ester having an alkyl group containing 4 or more carbon atoms, based on the total amount of the free resins. By satisfying this requirement, solvent resistance of the graft copolymer resin is improved.

The graft copolymer resin of the present embodiment can be produced by a conventionally known method, and for example, a polymerization method such as an emulsion polymerization method, a suspension polymerization method or a bulk polymerization method can be used. When the emulsion polymerization method is used, a latex of a graft copolymer resin can be obtained by graft polymerization of the above-described vinyl monomer to the above-described rubbery polymer. The latex of the graft copolymer resin is coagulated by a known method, and undergoes washing, dehydration, and drying steps to obtain a powder of the graft copolymer resin.

In the present specification, the free resin refers to a resin that can be separated from the graft copolymer resin by the following procedures (A) and (B):

(A) Acetone is added to the graft copolymer resin, and then an insoluble component and a solution are separated by centrifugation or the like. Thereby, the graft copolymer is separated as the insoluble component.

(B) The obtained solution is reprecipitated using a poor solvent such as methanol, and a precipitate is recovered by filtration or the like. As a result, an unreacted vinyl monomer and the like are separated to the solution side. The remaining precipitate is dried to obtain a free resin to be analyzed.

The type of the constituent unit contained in the free resin can be determined by applying a known method such as pyrolysis gas chromatography. In addition, the content of the constituent unit contained in the free resin, particularly the constituent unit derived from a vinyl cyanide monomer, an aromatic vinyl monomer, and a (meth)acrylic acid alkyl ester can be calculated by determining the content of each constituent unit by applying CHN analysis, oxygen analysis or the like described in Examples.

The content of the free resin in the graft copolymer resin can be adjusted, for example, by the following methods:

(A) The content of the (meth)acrylic acid alkyl ester having an alkyl group containing 4 or more carbon atoms in the vinyl monomer used for the graft polymerization is adjusted to, for example, 10 to 30% by mass.

(B) As an emulsifier used in the production of the rubbery polymer, for example, rosin acid or a derivative thereof is used.

(C) A polymerization regulator such as t-dodecyl mercaptan is added at the time of producing the rubbery polymer.

The graft copolymer resin of the present embodiment can be mixed with various thermoplastic resins to form a thermoplastic resin composition. Examples of the thermoplastic resin include polystyrene, a styrene-acrylonitrile copolymer, a styrene-methyl methacrylate copolymer, polymethyl methacrylate, a styrene-maleic anhydride copolymer, a styrene-maleimide copolymer, a styrene-acrylonitrile-maleimide copolymer, rubber-reinforced polystyrene (HIPS), an acrylonitrile-butadiene-styrene resin (ABS resin), an acrylonitrile-ethylene propylene-styrene resin (AES resin), a methyl methacrylate-butadiene-styrene resin (MBS resin), an acrylonitrile-n-butyl acrylate-styrene resin (AAS resin), polycarbonate, polyamide, polybutylene terephthalate, polyethylene terephthalate, polyphenylene oxide, and the like.

The content of the graft copolymer resin when the graft copolymer resin is mixed with the thermoplastic resin to form a thermoplastic resin composition is not particularly limited, and can be appropriately adjusted in consideration of the types of the graft copolymer resin and the thermoplastic resin, and for example, the content can be 10 to 50% by mass with respect to the total amount of the thermoplastic resin composition.

The thermoplastic resin composition can be obtained in a pellet form by melt-kneading using a known apparatus such as a Banbury mixer, a roll mill, or a twin-screw extruder. In the resulting thermoplastic resin composition, a plasticizer, a lubricant, a flame retardant, a pigment, a filler, a fiber reinforcing agent and the like can be appropriately blended as necessary. The thermoplastic resin composition thus obtained can be molded by injection molding, extrusion molding, compression molding, injection compression molding, blow molding, or the like.

EXAMPLES

Hereinbelow, the present invention will be specifically described with reference to examples, but the present invention is not limited to these examples. In the examples, % is based on mass.

[Production of Cross-Linked Butyl Acrylate Rubber Latex (a-1)]

A nitrogen-substituted glass reactor was charged with 219 parts by weight of deionized water, 10 parts by weight of styrene, 5.0 parts by weight of butyl acrylate, 0.035 parts by weight of allyl methacrylate, 0.15 parts by weight (in terms of solid content) of sodium dodecylbenzenesulfonate, and 0.15 parts by weight of potassium persulfate, and the mixture was reacted at 65° C. for 1 hour.

Thereafter, a mixed solution of 85 parts by weight of butyl acrylate and 0.60 parts by weight of allyl methacrylate and an aqueous emulsifier solution obtained by dissolving 0.75 parts by weight (in terms of solid content) of sodium dodecylbenzenesulfonate in 24 parts by weight of deionized water were continuously added over 3 hours. After the dropwise addition, the mixture was held for 3.5 hours to obtain a cross-linked butyl acrylate rubber latex (a-1).

[Production of Cross-Linked Butyl Acrylate Rubber Latex (a-2)]

A nitrogen-substituted glass reactor was charged with 219 parts by weight of deionized water, 10 parts by weight of styrene, 5.0 parts by weight of butyl acrylate, 0.035 parts by weight of allyl methacrylate, 0.011 parts by weight of t-dodecyl mercaptan, 0.15 parts by weight (in terms of solid content) of sodium dodecylbenzenesulfonate, and 0.15 parts by weight of potassium persulfate, and the mixture was reacted at 65° C. for 1 hour.

Thereafter, a mixed liquid of 85 parts by weight of butyl acrylate, 0.60 parts by weight of allyl methacrylate and 0.189 parts by weight of t-dodecyl mercaptan, and an aqueous emulsifier solution obtained by dissolving 0.75 parts by weight (in terms of solid content) of sodium dodecylbenzenesulfonate in 24 parts by weight of deionized water were continuously added over 3 hours. After the dropwise addition, the mixture was held for 3.5 hours to obtain a cross-linked butyl acrylate rubber latex (a-2).

[Production of Cross-Linked Butyl Acrylate Rubber Latex (a-3)]

A nitrogen-substituted glass reactor was charged with 219 parts by weight of deionized water, 10 parts by weight of styrene, 5.0 parts by weight of butyl acrylate, 0.035 parts by weight of allyl methacrylate, 0.0165 parts by weight of t-dodecyl mercaptan, 0.15 parts by weight (in terms of solid content) of sodium dodecylbenzenesulfonate, and 0.15 parts by weight of potassium persulfate, and the mixture was reacted at 65° C. for 1 hour.

Thereafter, a mixed liquid of 85 parts by weight of butyl acrylate, 0.60 parts by weight of allyl methacrylate and 0.2835 parts by weight of t-dodecyl mercaptan, and an aqueous emulsifier solution obtained by dissolving 0.75 parts by weight (in terms of solid content) of sodium dodecylbenzenesulfonate in 24 parts by weight of deionized water were continuously added over 3 hours. After the dropwise addition, the mixture was held for 3.5 hours to obtain a cross-linked butyl acrylate rubber latex (a-3).

[Production of Cross-Linked Butyl Acrylate Rubber Latex (a-4)]

A nitrogen-substituted glass reactor was charged with 219 parts by weight of deionized water, 10 parts by weight of styrene, 5.0 parts by weight of butyl acrylate, 0.035 parts by weight of allyl methacrylate, 0.375 parts by weight (in terms of solid content) of disproportionated potassium rosinate, and 0.15 parts by weight of potassium persulfate, and the mixture was reacted at 65° C. for 1 hour.

Thereafter, a mixed solution of 85 parts by weight of butyl acrylate and 0.60 parts by weight of allyl methacrylate and an aqueous emulsifier solution obtained by dissolving 2.125 parts by weight (in terms of solid content) of disproportionated potassium rosinate in 24 parts by weight of deionized water were continuously added over 3 hours. After the dropwise addition, the mixture was held for 3.5 hours to obtain a cross-linked butyl acrylate rubber latex (a-4).

[Production of Cross-Linked Butyl Acrylate Rubber Latex (a-5)]

A nitrogen-substituted glass reactor was charged with 219 parts by weight of deionized water, 0.165 parts by weight of styrene, 0.11 parts by weight of acrylonitrile, 5.225 parts by weight of butyl acrylate, 0.0352 parts by weight of allyl methacrylate, 0.0198 parts by weight of ethylene glycol dimethacrylate, 0.375 parts by weight (in terms of solid content) of disproportionated potassium rosinate, and 0.15 parts by weight of potassium persulfate, and the mixture was reacted at 65° C. for 1 hour.

Thereafter, a mixed liquid of 2.835 parts by weight of styrene, 1.89 parts by weight of acrylonitrile, 89.775 parts by weight of butyl acrylate, 0.6048 parts by weight of allyl methacrylate and 0.3402 parts by weight of ethylene glycol dimethacrylate, and an aqueous emulsifier solution obtained by dissolving 2.125 parts by weight (in terms of solid content) of disproportionated potassium rosinate in 24 parts by weight of deionized water were continuously added over 3 hours. After the dropwise addition, the mixture was aged for 3.5 hours while raising the temperature to 70° C. to obtain a cross-linked butyl acrylate rubber latex (a-5).

<Gel Content Measurement Method>

Gel contents of the cross-linked butyl acrylate rubber latexes (a-1) to (a-5) were measured by the following method.

After drying the above-described cross-linked butyl acrylate rubber latex, 0.25 g of the cross-linked butyl acrylate rubber latex was immersed in 100 ml of toluene for 48 hours, and then filtered with a 300 mesh wire gauze, and the filtration residue was completely dried. Weight after drying before immersion in toluene (W0) and weight of the completely dried filtration residue (W1) were measured, and the gel content was calculated from the following formula. The results are shown in Table 1.

$$(W1/W0) \times 100 = \text{Gel content [\%]}$$

TABLE 1

| | Cross-linked butyl acrylate rubber latex | | | | |
|---|---|---|---|---|---|
| | a-1 | a-2 | a-3 | a-4 | a-5 |
| Gel content [%] | 95 | 85 | 75 | 10 | 30 |

[Production of Graft Copolymer Resin (A-1)]

A nitrogen-substituted glass reactor was charged with 50 parts by weight (in terms of solid content) of the cross-linked butyl acrylate rubber latex (a-1), and the reactor was purged with nitrogen. After the nitrogen substitution, the temperature in the tank was raised to 60° C., and an aqueous solution obtained by dissolving 0.40 parts by weight of glucose, 0.025 parts by weight of anhydrous sodium pyrophosphate and 0.001 parts by weight of ferrous sulfate in 9.0 parts by weight of deionized water was added thereto. After reaching 65° C., a mixed liquid of 13 parts by weight of acrylonitrile (ACN), 37 parts by weight of styrene (STY) and 0.1 parts by weight of t-dodecyl mercaptan, and an aqueous emulsifier solution obtained by dissolving 1.0 part by weight of potassium oleate and 0.28 parts by weight (in terms of solid content) of t-butyl hydroperoxide in 16 parts by weight of deionized water were continuously added dropwise over 6 hours. After the dropwise addition, the mixture was held for 2 hours to obtain a graft copolymer resin (A-1).

[Production of Graft Copolymer Resins (A-2) to (A-3)]

Graft copolymer resins (A-2) to (A-3) were produced in the same manner as in the production of the graft copolymer resin (A-1) except that a mixed liquid containing acrylonitrile, styrene, butyl acrylate (BA) and t-dodecyl mercaptan (0.1 parts by weight) was used as a mixed liquid, and the addition amount was changed to the amount (unit: parts by weight) shown in Table 2.

[Production of Graft Copolymer Resins (A-4) to (A-5)]

Graft copolymer resins (A-4) to (A-5) were produced in the same manner as in the production of the graft copolymer resin (A-3) except for using the cross-linked butyl acrylate rubber latexes (a-2) to (a-3) in place of the cross-linked butyl acrylate rubber latex (a-1).

[Production of Graft Copolymer Resin (A-6)]

A graft copolymer resin (A-6) was produced in the same manner as in the production of the graft copolymer resin (A-1) except for using the cross-linked butyl acrylate rubber latex (a-4) in place of the cross-linked butyl acrylate rubber latex (a-1).

[Production of Graft Copolymer Resin (A-7)]

A nitrogen-substituted glass reactor was charged with 50 parts by weight (in terms of solid content) of a cross-linked butyl acrylate rubber latex (a-5), and the reactor was purged with nitrogen. After the nitrogen substitution, the temperature in the tank was raised to 65° C., and an aqueous solution obtained by dissolving 0.40 parts by weight of lactose, 0.025 parts by weight of anhydrous sodium pyrophosphate and 0.001 parts by weight of ferrous sulfate in 9.0 parts by weight of deionized water was added thereto. After reaching 70° C., a mixed liquid of 12.5 parts by weight of acrylonitrile and 37.5 parts by weight of styrene, and an aqueous emulsifier solution obtained by dissolving 1.0 part by weight of disproportionated potassium rosinate and 0.28 parts by weight (in terms of solid content) of t-butyl hydroperoxide in 16 parts by weight of deionized water were continuously added dropwise over 6 hours. After the dropwise addition, the mixture was held for 2 hours to obtain a graft copolymer resin (A-7).

[Production of Graft Copolymer Resin (A-8)]

A graft copolymer resin (A-8) was produced in the same manner as in the production of the graft copolymer resin (A-4) except that the addition time of the aqueous emulsifier solution was changed from 6 hours to 1 hour.

[Production of Graft Copolymer Resins (A-9), (A-10) and (A-12)]

Graft copolymer resins (A-9), (A-10) and (A-12) were produced in the same manner as in the production of the graft copolymer resin (A-4) except that the addition amounts of acrylonitrile, styrene and butyl acrylate in the mixed solution were changed to the amounts shown in Table 2.

[Production of Graft Copolymer Resin (A-11)]

A graft copolymer resin (A-11) was produced in the same manner as in the production of the graft copolymer composition (A-4) except that methyl methacrylate (MMA) was used instead of butyl acrylate.

[Production of Graft Copolymer Resin Powder (B-1)]

Deionized water was charged into a single tank type coagulation tank equipped with a stirring blade so that the slurry concentration was 18% when addition of the total amount of 100 parts by weight in terms of solid content of the graft copolymer resin to the tank was completed. Thereafter, 4.0 parts by weight of magnesium sulfate was added, and the temperature of the mixture was raised to 85° C. After reaching 85° C., 100 parts by weight of the graft copolymer resin (A-1) and 1.3 parts by weight of disproportionated potassium rosinate were added. After the addition, the temperature of the mixture was raised to 95° C. and held for 1 minute, then washed with water, dehydrated, and dried at 90° C. for 14 hours in a hot air dryer to obtain a graft copolymer resin powder (B-1).
[Production of Graft Copolymer Resin Powders (B-2) to (B-11)]

Graft copolymer resin powders (B-2) to (B-11) were produced in the same manner as in the production of the graft copolymer resin (B-1) except for using the graft copolymer resins (A-2) to (A-11) in place of the graft copolymer resin (A-1).
[Powdering of Graft Copolymer Resin (A-12)]

Although the graft copolymer resin (A-12) was used in place of the graft copolymer resin (A-1), and powdering was attempted in the same manner as in the production of the graft copolymer resin (B-1), the graft copolymer resin solidified and could not be powdered. Therefore, the graft copolymer resin (A-12) was excluded from target for subsequent evaluation.

<Free Resin Composition Analysis>

Free resin composition analysis was performed on the graft copolymer resin powders (B-1) to (B-11). Specifically, for a measurement sample prepared by the following method, the amount of acrylonitrile was calculated from the amount of nitrogen by the following CHN analysis, the amount of butyl acrylate was calculated from the amount of oxygen by the following oxygen (O) analysis. The total of acrylonitrile, styrene and butyl acrylate was taken as 100%, and the remainder obtained by subtracting the calculated amounts of acrylonitrile and butyl acrylate was calculated as the amount of styrene. Based on the acrylonitrile amount, the butyl acrylate amount and the styrene amount, the butyl acrylate amount (BA amount) in the free resin was calculated. The results are shown in Table 2. The graft copolymer resin powders (B-3) to (B-10) correspond to Examples, and the graft copolymer resin powders (B-1), (B-2) and (B-11) correspond to Comparative Examples, respectively.

(Preparation of Measurement Sample)

4.0 g of the graft copolymer powder was weighed, added with 50 mL of acetone, and left for 16 hours, and then an insoluble component and a solution were separated by centrifugation (20,000 rpm for 1 hour). The solution was concentrated, then dissolved in acetone and reprecipitated with methanol, and the filtrate was dried to obtain a solid. This solid was used as a measurement sample.

(CHN Analysis Conditions)

Apparatus: JM10 manufactured by J-SCIENCE LAB CO., Ltd.

Standard samples: acetanilide, phenacetin, antipyrine
Temperature: 1000° C.

(Oxygen Analysis Conditions)

Apparatus: MO-20 manufactured by Yanaco Analytical Systems Inc.

Standard sample: Cholesterol
Temperature: 1000° C.

TABLE 2

|  | Graft copolymer resin (Graft copolymer resin powder) | | | | | | | | | | | |
| --- | --- | --- | --- | --- | --- | --- | --- | --- | --- | --- | --- | --- |
|  | A-1 (B-1) | A-2 (B-2) | A-3 (B-3) | A-4 (B-4) | A-5 (B-5) | A-6 (B-6) | A-7 (B-7) | A-8 (B-8) | A-9 (B-9) | A-10 (B-10) | A-11 (B-11) | A-12 (B-12) |
| a-1 | 50 | 50 | 50 |  |  |  |  |  |  |  |  |  |
| a-2 |  |  |  | 50 |  |  |  | 50 | 50 | 50 | 50 | 50 |
| a-3 |  |  |  |  | 50 |  |  |  |  |  |  |  |
| a-4 |  |  |  |  |  | 50 |  |  |  |  |  |  |
| a-5 |  |  |  |  |  |  | 50 |  |  |  |  |  |
| Styrene | 37 | 34.8 | 33.3 | 33.3 | 33.3 | 37 | 37.5 | 33.3 | 29.6 | 25.9 | 33.3 | 18.5 |
| Acrylonitrile | 13 | 12.2 | 11.7 | 11.7 | 11.7 | 13 | 12.5 | 11.7 | 10.4 | 9.1 | 11.7 | 6.5 |
| Butyl acrylate |  | 3 | 5 | 5 | 5 |  |  | 5 | 10 | 15 |  | 25 |
| Methyl methacrylate |  |  |  |  |  |  |  |  |  |  | 5 |  |
| Addition time [h] | 6 | 6 | 6 | 6 | 6 | 6 | 6 | 1 | 6 | 6 | 6 | 6 |
| BA amount [%] in free resin | 3.1 | 8.0 | 11.9 | 14.0 | 17.8 | 13.2 | 11.4 | 15.2 | 23.2 | 31.7 | 0.0 | — |

[Production of Copolymer (C-1)]

A copolymer (C-1) composed of 74.5 parts by weight of styrene and 25.5 parts by weight of acrylonitrile was obtained by a known bulk polymerization method. Reduced viscosity of the obtained copolymer (C-1) was measured by the following method, and as a result, the reduced viscosity was 0.62 dl/g.

The solution was dissolved in N,N-dimethylformamide to form a solution having a concentration of 0.4 g/100 ml, and then the reduced viscosity was determined from the flow down time measured at 30° C. using a Cannon-Fenske viscosity tube.

(Evaluation of Graft Copolymer Resin Powder)

The graft copolymer resin powders (B-1) to (B-11) and the copolymer (C-1) were mixed in the addition amounts shown in Table 3, and then the mixture was melt-kneaded at 240° C. using a 40 mm twin-screw extruder to be pelletized, thereby obtaining pellets of a thermoplastic resin composition. From the obtained pellets, various molded articles were molded by an injection molding machine set at 250° C., or test pieces were prepared by a pressing machine, and each measurement and evaluation were performed by the following methods. The results are shown in Table 3.

<Impact Resistance>

Various test pieces were molded using the above pellets in accordance with ISO294, and impact resistance (unit: kJ/m$^2$) was measured. Specifically, notched Charpy impact value was measured at a thickness of 4 mm in accordance with ISO179.

<Fluidity>

Using the above pellets, a melt volume flow rate (MVR) (unit; cm$^3$/10 minutes) was measured at 10 kg load condition and 220° C. in accordance with ISO1133.

<Evaluation of Solvent Resistance>

Using the above pellets, a test piece having a length of 10 cm×a width of 2 cm×a thickness of 0.2 cm was prepared by a pressing machine. As evaluation, a solvent was applied to the side on which the test piece was fixed using a cantilever jig, a load of 600 g was applied to the opposite side, and the test piece was observed for 3 minutes and evaluated according to the following criteria. As the solvent, hexane/ethanol=1/1 (weight ratio) was used.

TABLE 3

|  | Example | | | | | | | | Comparative Example | | |
|---|---|---|---|---|---|---|---|---|---|---|---|
|  | 1 | 2 | 3 | 4 | 5 | 6 | 7 | 8 | 1 | 2 | 3 |
| Graft copolymer resin powder (B) | | | | | | | | | | | |
| B-1 | | | | | | | | | 30 | | |
| B-2 | | | | | | | | | | 30 | |
| B-3 | 30 | | | | | | | | | | |
| B-4 | | 30 | | | | | | | | | |
| B-5 | | | 30 | | | | | | | | |
| B-6 | | | | 30 | | | | | | | |
| B-7 | | | | | 30 | | | | | | |
| B-8 | | | | | | 30 | | | | | |
| B-9 | | | | | | | 30 | | | | |
| B-10 | | | | | | | | 30 | | | |
| B-11 | | | | | | | | | | | 30 |
| Copolymer C-1 | 70 | 70 | 70 | 70 | 70 | 70 | 70 | 70 | 70 | 70 | 70 |
| Impact resistance | 2.7 | 2.9 | 2.8 | 1.3 | 1.2 | 2.9 | 2.1 | 2.1 | 2.8 | 2.8 | 2.2 |
| Fluidity | 15 | 22 | 23 | 21 | 18 | 22 | 27 | 39 | 18 | 15 | 19 |
| Solvent resistance | A | A | A | A | A | A | A | A | B | B | B |

A: No cracking
B: Cracked

The invention claimed is:

1. A graft copolymer resin obtainable by graft-polymerizing a vinyl monomer comprising a vinyl cyanide monomer and an aromatic vinyl monomer to a rubbery polymer comprising constituent units derived from a (meth)acrylic acid alkyl ester having an alkyl group containing 4 or more carbon atoms and styrene, wherein
   a free resin contained in the graft copolymer resin comprises 10 to 35% by mass of a constituent unit derived from a (meth)acrylic acid alkyl ester having an alkyl group containing 4 or more carbon atoms, based on the total amount of the free resins; and
   the rubbery polymer comprises 50% by mass or more and 95% by mass or less of the constituent unit derived from the (meth)acrylic acid alkyl ester having an alkyl group containing 4 or more carbon atoms, based on the total amount of the rubbery polymer.

2. The graft copolymer resin according to claim 1, wherein the vinyl monomer comprises 10 to 30% by mass of a (meth)acrylic acid alkyl ester having an alkyl group containing 4 or more carbon atoms, based on the total amount of the vinyl monomers.

3. The graft copolymer resin according to claim 1, wherein the rubbery polymer comprises 60% by mass or more and 95% by mass or less of the constituent unit derived from the (meth)acrylic acid alkyl ester having an alkyl group containing 4 or more carbon atoms, based on the total amount of the rubbery polymers.

4. The graft copolymer resin according to claim 1, wherein the rubbery polymer has a gel content of 75 to 90%.

5. The graft copolymer resin according to claim 2, wherein the rubbery polymer comprises 70% by mass or more and 95% by mass or less of the constituent unit derived from the (meth)acrylic acid alkyl ester having an alkyl group containing 4 or more carbon atoms, based on the total amount of the rubbery polymers.

6. The graft copolymer resin according to claim 2, wherein the rubbery polymer has a gel content of 75 to 90%.

7. The graft copolymer resin according to claim 3, wherein the rubbery polymer has a gel content of 75 to 90%.

8. The graft copolymer resin according to claim 5, wherein the rubbery polymer has a gel content of 75 to 90%.

9. The graft copolymer resin according to claim 1, wherein the vinyl monomer further comprises a (meth)acrylic acid alkyl ester having an alkyl group containing 4 or more carbon atoms.

* * * * *